H. T. MORSE.
Construction of Hulls of Vessels.

No. 216,802.    Patented June 24, 1879.

Witnesses:
E. A. Hemmenway.
C. H. Dodd.

Inventor:
Henry T. Morse
by N. P. Lombard,
Attorney.

UNITED STATES PATENT OFFICE.

HENRY T. MORSE, OF ATHOL, MASSACHUSETTS.

IMPROVEMENT IN CONSTRUCTION OF HULLS OF VESSELS.

Specification forming part of Letters Patent No. 216,802, dated June 24, 1879; application filed May 5, 1879.

*To all whom it may concern:*

Be it known that I, HENRY T. MORSE, of Athol, in the county of Worcester and State of Massachusetts, have invented certain new and useful Improvements in the Construction of Hulls of Vessels, of which the following, taken in connection with the accompanying drawings, is a specification.

My invention relates to the construction of the hulls of steamboats and other vessels, and to the arrangement of the propelling and steering apparatus relative to said hulls, and has for its object the construction of hulls having great breadth of beam and large carrying capacity, and at the same time capable of being propelled through the water at great speed; and it consists, first, in constructing the hulls of steam and other vessels with a main hull resting upon three sub-hulls, arranged, one centrally under the forward part of the main hull and extending aft to about midships, and two under the after portion of the main hull, upon opposite sides of and equidistant from the longitudinal center line of said main hull and extending forward to about midships, as will be further described.

It further consists in the use, in combination with a main hull supported upon or supplied with three sub-hulls, as above described, of one or more propeller-screws located directly beneath the main hull and between the two after sub-hulls, with the ends of their blades above the bottoms of the keels of said sub-hulls, whereby said screws are entirely protected by said hulls against coming in contact with large floating objects, by which they might otherwise be broken.

It further consists in the use, in combination with a main hull and three sub-hulls, arranged as above described, of two rudders, arranged, one in line with the keel of each of the two after sub-hulls, as will be described.

Figure 2:
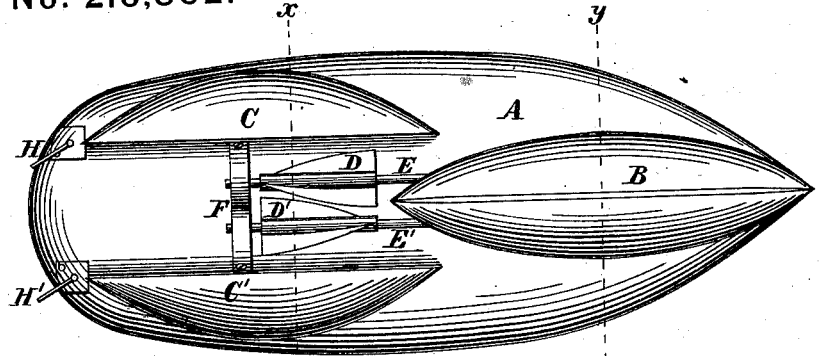
Figure 1:
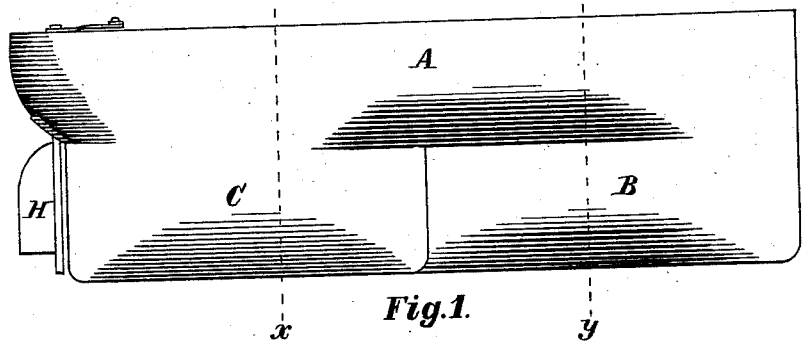
Figure 3:
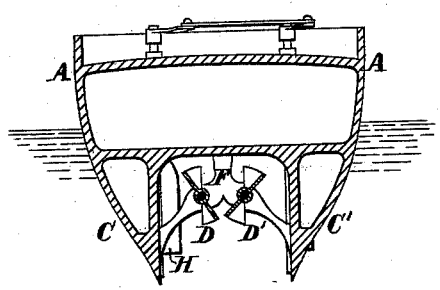
Figure 4:
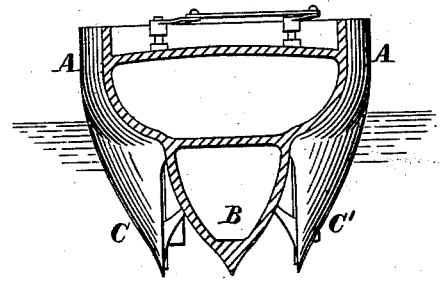

Figure 1 of the drawings is a side elevation of a boat illustrating my invention. Fig. 2 is an inverted plan of the same. Fig. 3 is a transverse vertical section on line $x\,x$ on Figs. 1 and 2, looking aft; and Fig. 4 is a similar section on line $y\,y$ on Figs. 1 and 2, also looking aft.

A is the main hull, made with extra great breadth of beam and a comparatively flat bottom; B, the forward sub-hull, arranged centrally under the main hull and extending from the extreme forward part of said main hull to about midships thereof, said sub-hull being made narrow in the beam and quite sharp both forward and aft, as shown.

C and C′ are the two after sub-hulls, made in the form of semi-hulls, or each having their outer sides curved both longitudinally and vertically, and their inner sides straight, or nearly so, both longitudinally and vertically, as shown. These sub-hulls C and C′ are placed about one-half the width of the beam of the main hull apart; and within the space between them, and aft of the sub-hull B, are located the propelling-screws D and D′, mounted upon the shafts E and E′, which have their after bearings in the bracket F, and their forward bearings inside of the sub-hull B.

H and H′ are two rudders, which may be of ordinary construction, arranged one aft of each of the after sub-hulls, and in line with the keel of said sub-hull, as shown, the rudder-posts being connected together in such a manner that said rudders must move in unison with each other.

The forms and proportions of the main hull and the several sub-hulls may be varied to suit the circumstances of the particular case, and the screws may be located farther aft, provided they are kept between the after sub-hulls; or a single screw may be used instead of two without affecting the principles of my invention.

This construction of hull and arrangement of the propelling and steering devices are particularly adapted to lighters, tugs, and, in fact, to all vessels in which it is desirable to combine large carrying capacity with great speed, as the resistance to the passage of the hull through the water is very greatly diminished when constructed according to my invention, as compared with the form of hull now in common use and of the same carrying capacity.

I do not claim, broadly, the use of two screws or two rudders, as I am aware that such have been used before; but

What I claim as new, and desire to secure by Letters Patent of the United States, is—

1. The combination of the main hull A and the sub-hulls B, C, and C', constructed and arranged, relative to each other, substantially as and for the purposes described.

2. The combination of the main hull, A, sub-hulls B, C, and C', and one or more propeller-screws located beneath the main hull, and between the sub-hulls C and C', substantially as and for the purposes described.

Executed at Athol, Massachusetts, this 28th day of April, A. D. 1879.

HENRY T. MORSE.

Witnesses:
   THOMAS H. GOODSPEED,
   CHAS. HORR.